US00RE33840E

United States Patent [19]

Peterson et al.

[11] E Patent Number: Re. 33,840

[45] Reissued Date of Patent: Mar. 10, 1992

[54] COMBINATION LOG DEBARKER-CHIPPER

[75] Inventors: Arnold N. Peterson, Eugene; Larry A. Sprague, Dexter, both of Oreg.

[73] Assignee: Peterson Pacific Corporation, Eugene, Oreg.

[21] Appl. No.: 571,869

[22] Filed: Aug. 22, 1990

Related U.S. Patent Documents

Reissue of:

[64] Patent No.: 4,889,169
Issued: Dec. 26, 1989
Appl. No.: 312,941
Filed: Feb. 21, 1989

[51] Int. Cl.[5] ..... B27L 7/00; B27L 1/00

[52] U.S. Cl. ..... 144/208 J; 144/3 D; 144/176; 144/337; 144/341; 144/370; 241/101.7

[58] Field of Search ..... 144/2 Z, 3 D, 208 R, 144/208 J, 176, 337, 341, 370, 3 R; 241/101.7

[56] References Cited

U.S. PATENT DOCUMENTS

| | | | |
|---|---|---|---|
| 3,524,485 | 8/1970 | Smith | 144/176 |
| 3,688,821 | 9/1972 | McColl | 144/3 D |
| 3,844,489 | 10/1974 | Strong | 144/176 |
| 4,078,590 | 3/1978 | Smith | 144/176 |
| 4,368,764 | 1/1983 | Peterson et al. | 144/2 Z |
| 4,534,390 | 8/1985 | Morey et al. | 144/176 |
| 4,640,325 | 2/1987 | Vaders | 144/208 J |

FOREIGN PATENT DOCUMENTS

| | | | |
|---|---|---|---|
| WO87/05852 | 10/1987 | World Int. Prop. O. | 144/337 |

*Primary Examiner*—W. Donald Bray
*Attorney, Agent, or Firm*—Robert L. Harrington

[57] ABSTRACT

A combination log debarking, log chipping unit having a debarking apparatus and a chipping apparatus mounted on a common chassis, the two apparatus are aligned for conveying logs from the debarking apparatus to the chipping apparatus. The two apparatus are separated by a space of about 6-10 feet to permit loose bark to be removed from the logs and thereby avoid bark contamination of the chip. A conveyor system between the two apparatus guides and conveys logs to the chipper. A single power source enables control over the feeding of the logs to synchronize log feeding with the chipper's chipping capability. A loader over the debarking apparatus provides convenient loading of the logs into the debarker. The power source and controls for the various operating components are all under the common control of the loader operator.

12 Claims, 4 Drawing Sheets

COMBINATION LOG DEBARKER-CHIPPER

Matter enclosed in heavy brackets [ ] appears in the original patent but forms no part of this reissue specification; matter printed in italics indicates the additions made by reissue.

FIELD OF THE INVENTION

This invention relates to in-field processing of logs into chips, and more particularly to the provision of a single mobile unit incorporating both the debarking and chipping operations for such processing.

BACKGROUND OF THE INVENTION

Chips produced from logs are used in making pulp which in turn is used to make paper and chip board used primarily for construction. In either case, it is undesirable to have tree bark mixed in with the chips to ultimately end up in the paper or chip board produced therefrom. Thus, it is a common practice to precede the chipping operation with a debarking operation.

In the past, logs to be chipped were hauled from the logging site to a pulp to chip board producing mill where the logs were processed. It has been found, however, that the difficulties, and accordingly the costs, of hauling full size logs can be substantially reduced by processing the logs at the logging site. Rather than using log hauling truck beds, trucks with large boxes can be filled with the chips and hauled far more conveniently and efficiently.

Accordingly, mobile chipper units and mobile debarking units have been developed. Each includes a power source, control apparatus and a substantial undercarriage. Each is hauled to the in-field processing site and set up to perform, independently, its own chipping or debarking function. Where logs are to be debarked and then chipped, i.e. the combination of functions contemplated for this invention, the two units are operated, still independently, but cooperatively as will be hereafter explained.

For the operation of the debarking unit, tree stems or logs are hauled from the cutting area and piled along side the unit. A loader (a boom with a grapple) picks up the logs and feeds them into the inlet of the debarking unit. As the logs are fed through the debarking unit, bark removing elements, e.g. flails, break the bond between the bark and the log core and the bark drops into a bark removing chute. The feeding of the logs through the flails is continuous with the logs being passed into and through the bark flailing station and out the other side, i.e. the exit or outlet of the debarking unit.

A debarking unit of the type herein contemplated is illustrated in U.S. Pat. Nos. 4,729,415, 4,721,139 and 4,719,950.

The debarked logs are then fed into the chipping unit. Typically a large number of knives or blades are mounted on a large, rigid disc. There are a number of designs for this chipping disc but in any event, it is of massive design to withstand heavy loads. The knife carrying disc is rotated to drive the knives into the log as the log is moved into the disc. This operation is capable of reducing a large log or a plurality of small logs fed simultaneously into the chipping unit, into small chips suitable for pulp or chip board within seconds. This chipping operation has very high power requirements with occasional power demands that exceed the power source capability. When this happens, the power source lugs down or slows up, a signal to the operator that the feeding of the logs needs to be slowed.

To reduce handling of the logs, some in-field log processing operators have arranged for the two units to be placed adjacent one another in a manner where the functions are performed cooperatively. The chipping apparatus is commonly equipped with a loader. The exit end of the debarker is lined up and positioned relative to the entry of the chipper to enable feeding directly from the debarker into the chipper. The loader, mounted on the chipper chassis, is used to reach over the debarking unit and feed the logs into the debarking unit. The feed rolls of the debarking unit simply continue the movement from the debarking unit into the feed rolls of the chipper.

The problems with this "reduced handling" concept of infield processing are several.

The chipping and debarking units must be placed close together or the logs will not feed properly from the debarking unit into the chipping unit. Also, if they are not close together, the loader operator, in his cab positioned over the chipping unit, has difficulty in maneuvering the logs for feeding them into the debarking unit. A problem occurs with the close placement of the units as it frequently happens that a small quantity of loose bark from the debarking operation is carried by the logs out of the debarking apparatus. This small quantity of bark is normally dropped off the logs if there is an intermediate handling of the logs. With the logs being fed directly into the chipping unit, the bark can become fed with the logs in the chipping unit resulting in a much greater contamination of the chips which is undesirable.

The power source of the chipping unit, as previously explained, lugs down when being overfed. With the debarking unit feeding the logs directly into the chipper, the log feeding process can get out of sync, i.e. the debarking unit will push the logs into the chipping unit at a rate faster than the chipping unit can process the logs. The chips formed when the chipper is overfed and thus lugged down will not be uniform which is undesirable. Also, the overloading can be such as to cause the engine to stop. This interruption of the process is also undesirable.

The in-field processing site is frequently a series of in-field processing sites that are simply spaced locations along a road, and most likely that road is a narrow rough logging road. Setting up the units is time consuming when the units are operated totally independently. To align them for continuous unit-to-unit feeding, further complicates that procedure. One of the units may have to be jacked up or the other lowered as by digging a trench under the supporting wheels. When the procedure has to be repeated on a frequent basis to process small stacks of logs spaced along the roadway, the efficiency gained from unit-to-unit feeding is greatly eliminated.

Considering the same frequent move of the units, the multiple tractors used to move these units creates congestion. The roads are narrow and frequently have no room to maneuver the units into the proper space, disconnect them from the tractors and get the tractors moved out of the way. Also, recall that a third vehicle is involved. The chip hauling truck must also be maneuvered into position for receiving the chips.

BRIEF SUMMARY OF THE INVENTION

The present inventio reduces or eliminates the above difficulties and additionally provides the operations of debarking and chipping in a more efficient and cost saving manner.

In the preferred embodiment of the invention, the apparatus of the chipping unit and the apparatus of the debarking unit are mounted on a common chassis. A single trailer carries a rear mounted debarking apparatus with a loader positioned over the inlet of the debarker. A chipping apparatus is placed forwardly of the exit end of the debarking apparatus a sufficient distance to permit removal of loose bark carried by the debarked logs before those logs enter the chipping apparatus. Upper and lower feed rollers carried by the trailer between the debarker and chipper maintain control over the logs as they pass from the debarking apparatus to the chipping apparatus. Loose bark that is jarred or brushed off the logs passes through spaces between the lower rollers to the undercarriage or to the ground.

The trailer carries a single power source, a single hydraulic system, a single fuel supply and a single control panel to enable operation of all units from the cab of the loader. The cost savings of having one versus two or even three of each of these items is substantial, not only in the purchase cost but in avoiding multiple operators. Whereas the units are powered by a common power source, they are maintained in sync to avoid overloading the chipper.

The single tractor for the combination unit can be left attached to the trailer so that moving the entire operation reduces tear down and set up time to minutes versus hours as was previously required. Maneuvering one large unit versus two smaller units to be interconnected is far simpler. Also, providing for the chip hauling truck to have accessibility to the chip discharging chute of the chipping apparatus is made simpler.

These and other advantages will become more apparent upon reference to the following detailed description having reference to the accompanying drawings wherein.

Figure 4:
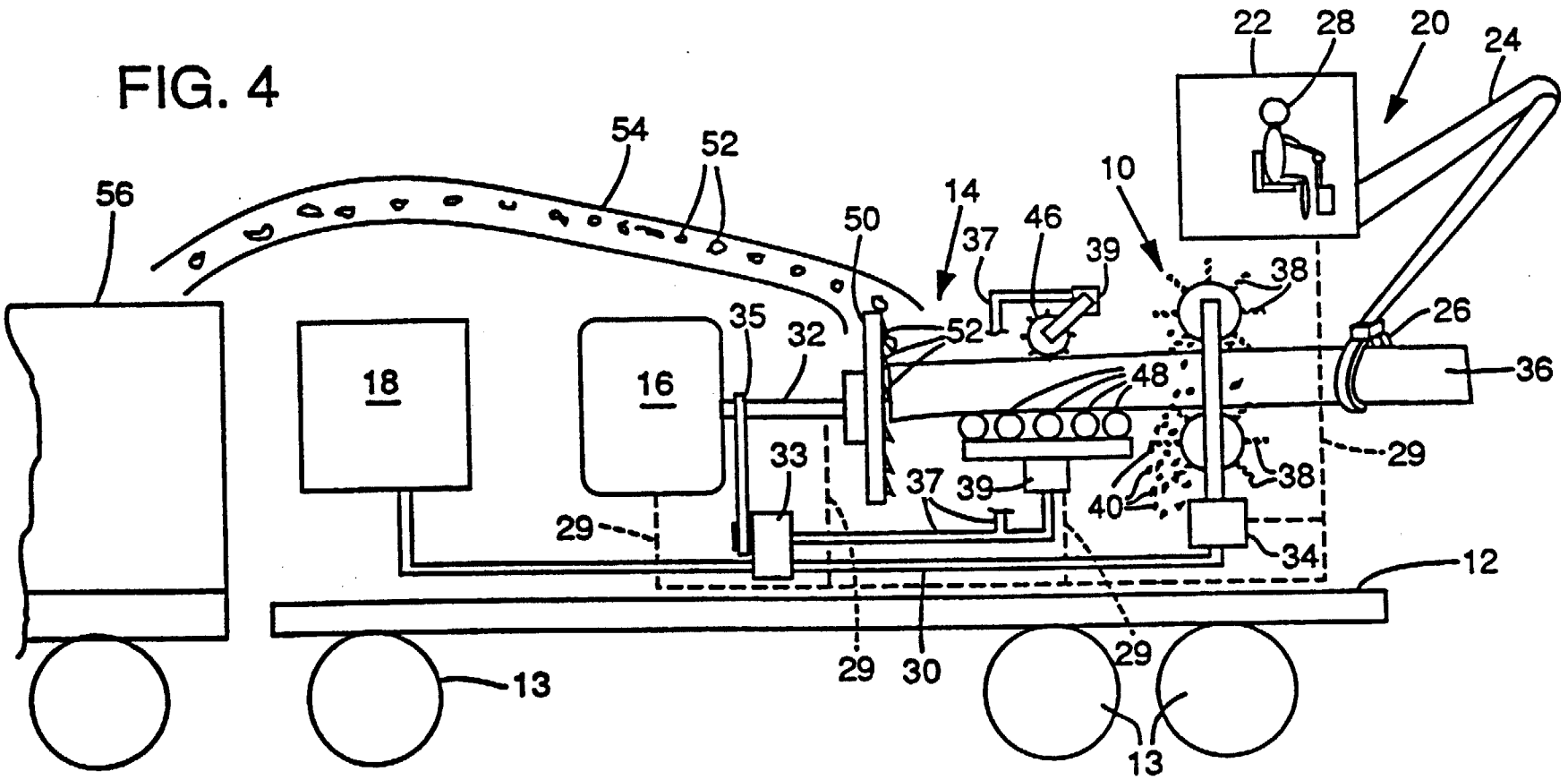
FIG. 4 is a schematic view illustrating the inter-relationship of the various components of the apparatus.

Reference is first made to FIG. 4 illustrating the concept of the invention. In general, a debarking station 10 of a debarking apparatus is positioned on the rear end of a trailer 12 supported on wheels 13. Spaced forwardly of the debarking station 10 on the trailer 12 is a chipping station 14 of a chipping apparatus. Positioned forward of the chipping station 14 is the unit's power source consisting of an engine 16 and a hydraulic fluid reservoir 18.

Positioned above the inlet to the debarking station 10 is a loader 20 which includes a cab 22, boom 24 and grapple 26. Controls for operating all of the powered units is contained in the cab 22 and operated by an operator 28.

In brief, the chipping disc 50 is driven directly from the engine 16 by shaft 32. The debarking flails 38 and feed rollers 6, 48 are powered by hydraulic fluid from the reservoir 18. A hydraulic pump 33 is driven off shaft 22 by belt drive 35. Hydraulic fluid is pumped through lines 30, 37 to the hydraulic drive motor 34 of the flail drums 38 and to motors 39 of the feed rollers 46, 48. Returns lines for the hydraulic fluid are not shown.

The loader 20 is typically provided with a separate power source However, it may be powered by the same engine 16 but would likely be powered through hydraulic lines and a pump independent of the shaft leading to the chipper. They also are not shown. The operator 28, through lines 29 and a control panel in his cab 22, in addition to the boom and grapple, controls all the powered operations including engine 16, the chipping operator (14), debarking operation (10) and the conveyor operation (rollers 46,48).

The operator 28 maneuvers the loader 20 to feed a log(s) 36 into the entry of the debarking station 10 wherein debarking flails 38 remove the bark from the log 36. (In actuality, the loader 24 would have released the log 36 by the time it got part way into the debarking station where feed rollers take over feeding the log through the system. In the position of the log 36 that is illustrated, the loader would be moving back to the log pile to pick up a succeeding log load.)

Figure 1:
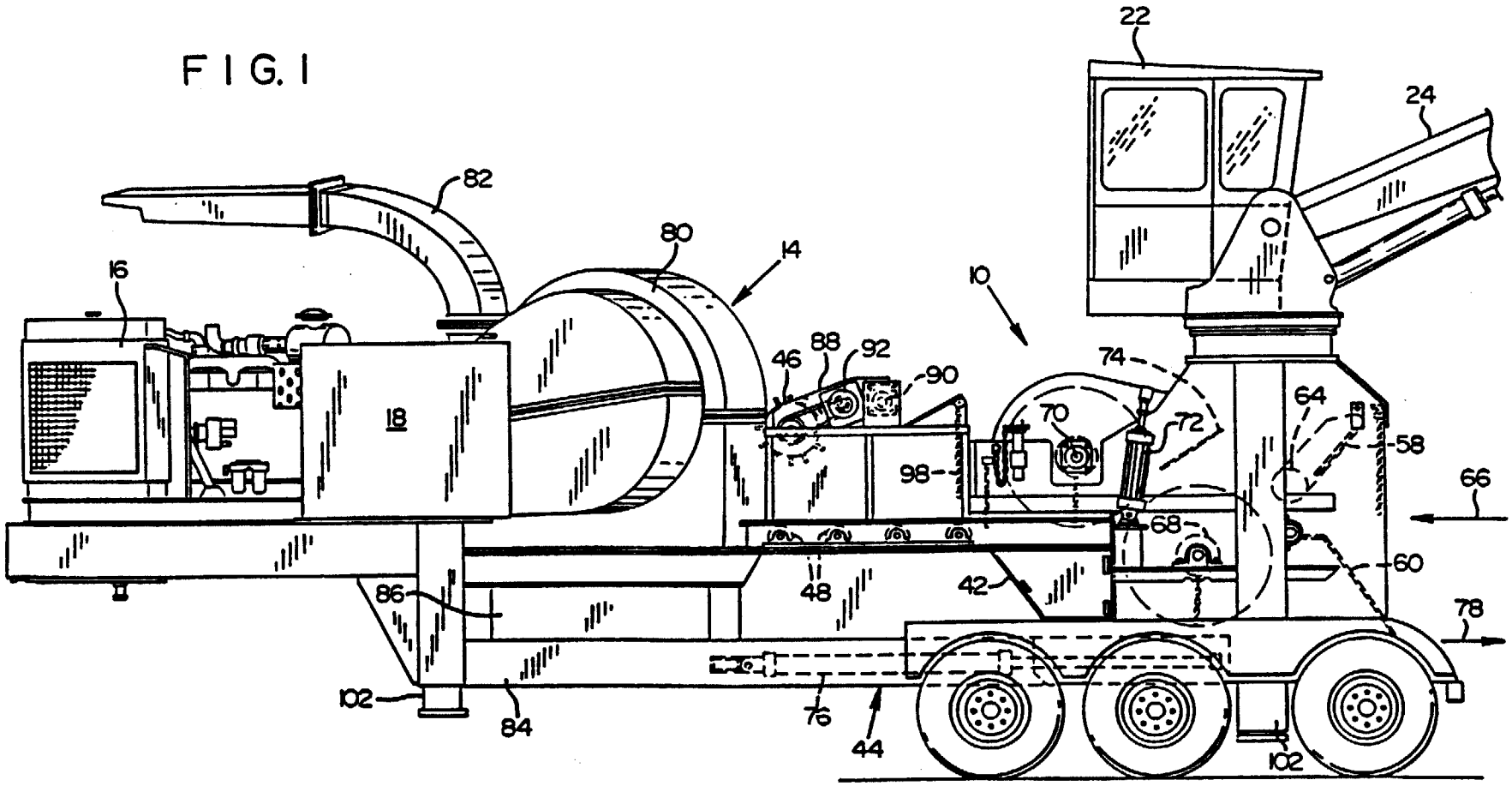
FIG. 1 is a side view of a combination debarking-chipping unit in accordance with the present invention.

The removed bark 40 flails into a bark removing chute 42 (see FIG. 1) which directs the bark into a bark moving device 44 (also shown in FIG. 1 and specifically disclosed in U.S. Pat. No. 472,945). The debarked log(s) is then conveyed by an upper drive roller 46 and lower drive rollers 48, into a chipping disc 50. The log is chipped by knives 52 mounted on the disc and the chips are discharged through chip discharging chute 54 into a truck box 56 of a chip hauling truck.

Having described the concept generally, the components of the above detailed drawings 1–3 will now be described.

Figure 2:
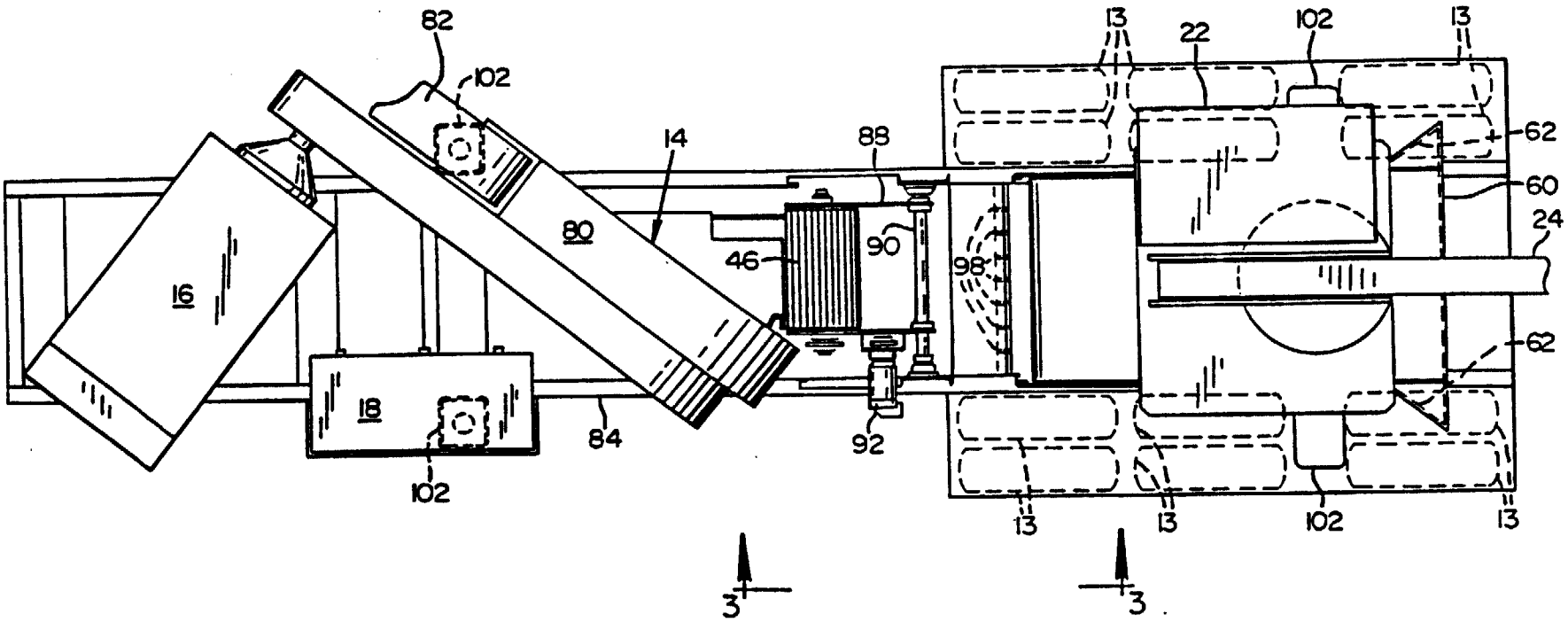
FIG. 2 is a top view of the apparatus of FIG. 1.
Figure 3:
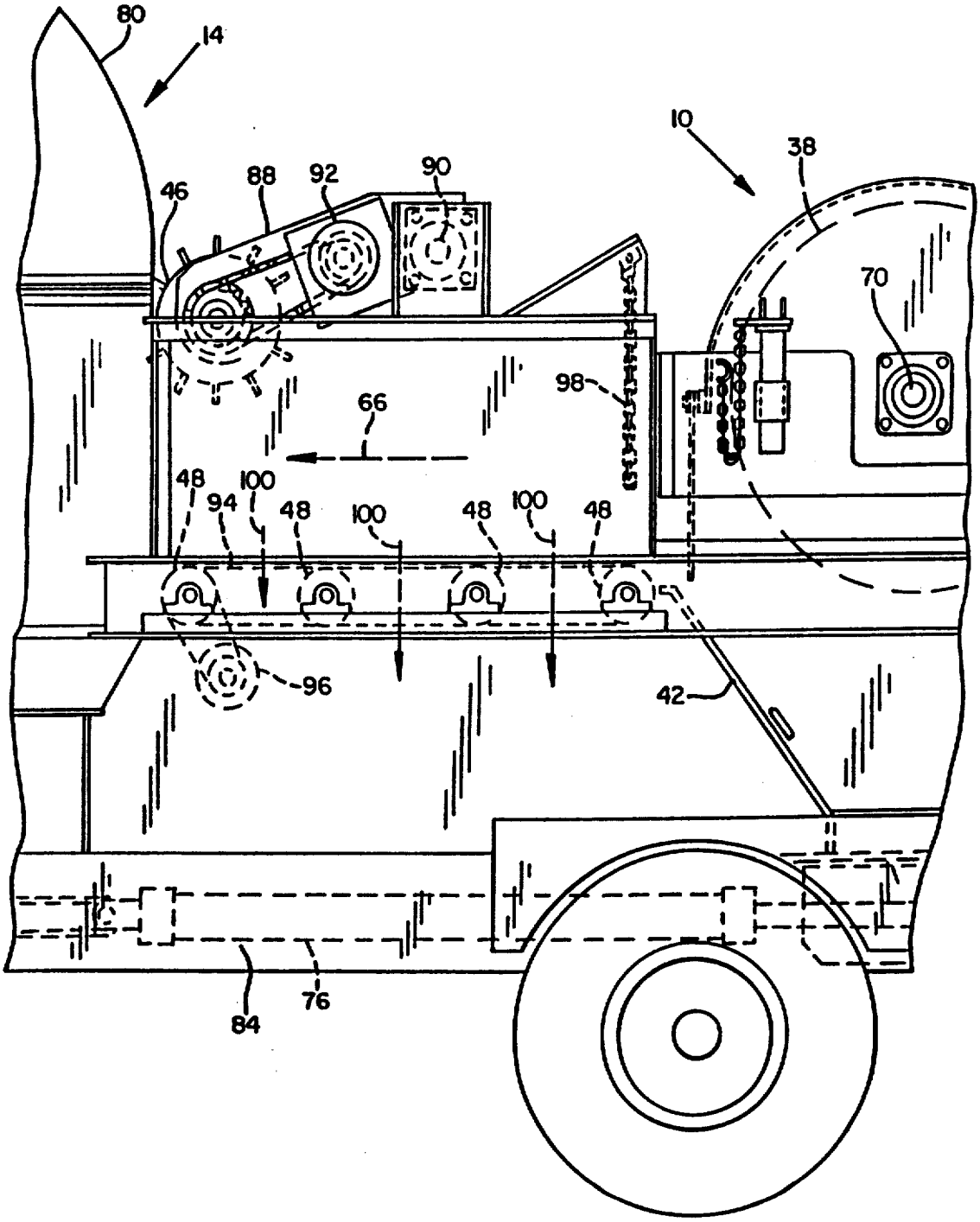
FIG. 3 is an enlarged view of the conveyor system between debarking and chipping apparatus as taken on view lines 3—3 of FIG. 2.

The debarking apparatus in and of itself is not new to this invention The apparatus components as illustrated in FIGS. 1–3 are essentially shown and described in detail in the above referred to patents. In brief, a log or a plurality of logs are directed into the inlet defined by the converging top plate 58, bottom wall 60 and side walls 62. The top plate 58 carries a top feed roller 64 and the two pivot inwardly and upwardly to accommodate different diameters of the log. A horizontal path is provided throughout the system and is indicated in FIG. 1 by directional arrow 66.

The log or logs first engage the flails 38 of the lower flail drum 68 which is fixed. The upper flailing drum 70 also carrying flails 38, is mounted on a pivotal arm which is counter balanced by cylinder 72. An adjusting plate or gate 74 is engaged by the logs being moved along path 66 to raise the upper flailing drum to the correct height. The flails 38 are cooperatively designed to cover the entire diameter of the logs fed through the debarking station. The bark is directed by the chute 42 into the bark remover 44. A plunger 76 shoves the bark out the rear of the apparatus as indicated by arrow 78. As previously explained, the above components and their operations are largely explained in greater detail in the prior listed patents.

The conveyor system that conveys the logs from the debarking apparatus to the chipping apparatus will be explained in more detail hereafter. At this point, the reader need only appreciate that the logs are conveyed by the conveyor system from the debarking station 10 into the chipper station 14, the internal components of which are not shown. The chipping apparatus is of conventional design and produced by several companies.

The chipping disc and the drive components are enclosed by the shroud 80, with a chip discharge chute 82 being structed to allow the chute end to swivel as may be required to accommodate the location of the chip hauling truck. (See item 56 of FIG. 4) Mounted just forward of the chipping apparatus (station 14) is a large hydraulic fluid reservoir 18 and just forward of that is the engine 16. A fuel storage tank 86 for the engine is located on the trailer frame 84.

The hydraulic lines are not illustrated in the detail drawings and further explanation of the inter-relationship of the engine and hydraulic drive system is being deleted. Power design engineers are well familiar with the design requirements for accomplishing the stated objectives as already explained in connection with FIG. 4, and further detailed explanation herein is unnecessary.

The conveyor for transferring the logs from the debarking station to the chipping station is uncomplicated but important to the desired operations of debarking and chipping. This inter-apparatus or station conveyor is more specifically disclosed in FIG. 3. However, before explaining the conveyor system, the reader should understand and appreciate that the common chassis, i.e. the provision of a common frame 84, enables the builder to build in the appropriate alignment and spacing as between the debarking station and chipping station. The desired spacing from exit to entry between these two units is about 6–10 feet. Even with the built in alignment, additional guidance is necessary to avoid having the logs escape from the path 66 while traveling from one unit to the other. Such guidance is provided by the upper and lower drive rollers 46, 48.

The upper guide roller 46 is mounted on an arm 88 that is pivoted at pivot 90. The roller 46 is driven by motor 92. The multiple bottom drive rollers 48 are spaced apart and span the distance between the debarking station exit and the chipping station entrance, as shown. They are driven by a common drive belt 94 driven by motor 96.

It will be understood that most of the bark from the debarking operation is accumulated by the chute 42 as explained. However, a small but significant percentage of the bark rides the log out of the debarking station. A chain curtain 98 is provided primarily for safety but it does drag along the top of the logs as the logs pass through the curtain which dislodges much of the bark that remains on the logs. Other aids for causing the bark to rub off or fall off the logs before entering the chipper are, of course, also available. However, it has been experienced that the action of the log shifting and rolling as it is being conveyed through the system is quite sufficient for dislodging the bark. With the 6–10 feet provided between the units, substantially all of the bark will be removed. Because it is important to avoid dragging the bark into the chipping station, it is considered important to provide the openings (indicated by arrows 100) between the bottom rollers for removal of this bark.

It has been previously explained that a common power source for the debarking and chipping units is important. The chipping disc 50 (see FIG. 4) will be unavoidably overloaded from time to time. When this happens, the movement of the log or logs 36 must be slowed or the chipping disc will simply be stopped. With the present linkage of the disc drive shaft 32 and the hydraulic drive systems (belt 35, pump 33), such a slow down of the log movement is automatic. The hydraulic drive to motor 39 of the drive rollers 46, 48 is slowed by causing the slow down of the disc drive shaft 32.

Numerous modifications, variations and improvements will become apparent to those skilled in the art without avoiding the concept of the invention. Some have been mentioned as for example the provision of a bark removing device located over the logs as the logs emerge from the debarking station. Different arrangements and organizations of the various components is also possible. Of course, a number of conventional features have not been stressed that will be evident. Stabilizers 102 are provided to stabilize the trailer when set up for chip processing. The cab 22 is preferably hingedly mounted to the trailer structure and folded down behind the trailer during travel to meet highway heighth requirements. Such a manner of mounting loader cabs is not uncommon.

Accordingly, it is necessary to refer to the claims appended hereto to determine the scope and definition of the invention.

We claim:

1. A mobile, combination log debarking and log chipping unit for debarking and chipping multiple logs comprising;

a chassis including a support frame and wheels defining a front end and rear end of the chassis, a debarking apparatus mounted on the frame at one end of the chassis, said debarking apparatus including a debarking station having an entry and exit, and defining a pathway into and through the debarking apparatus whereby logs can be directed from said one end of the chassis, through the entry of the debarking station to be directed out of the exit thereof and continuing along the pathway toward the other end of the chassis, means for removing bark chips from said barking station as the log exits the debarking apparatus, a chipping apparatus method on the frame at a location toward said other end relative to the debarking apparatus, said chipping apparatus including a chipping station having an entry that is aligned with and spaced from the exit of the debarking station for receiving logs therefrom, and a chip discharging chute for directing the chips produced in the chipping station away from the chassis, conveyor means for conveying and guiding logs along said pathway through the debarking station and into the chipping station, and a power source mounted on the frame of the chassis for providing operating power for operating the debarking station, chipping station and conveyor means.

2. A mobile, combination log debarking and log chipping unit as defined in claim 1 including a log loader mounted on the frame in the proximity of the debarking station entry for feeding logs into the debarking station.

3. A mobile, combination log debarking and log chipping unit as defined in claim 1 wherein the power source dictates the rate of movement of logs being conveyed through the unit, said power source being responsive to overfeeding of the chipping station to slow the rate of movement of the logs.

4. A mobile, combination log debarking and log chipping unit as defined in claim 3 wherein the power source includes a common drive means for the chipping apparatus and conveyor means whereby slow down of the chipping apparatus correspondingly slows down the conveyor means.

5. A mobile, combination log debarking and log chipping unit as defined in claim 4 wherein a drive belt provides mechanical drive to the chipping apparatus and a hydraulic motor driven by hydraulic fluid from a pump provides hydraulic drive to the conveyor means, said pump coupled to the drive shaf and driven thereby.

6. A mobile, combination log debarking and log chipping unit as defined in claim 5 wherein an operator control cab is provided at the location of the log loader, and a control panel in cab for controlling the debarking, chipping and log conveying operations and the log loading operation.

7. A mobile, combination log debarking and log chipping unit as defined in claim 1 wherein the conveyor means includes upper and lower conveyor rollers positioned above and below the pathway and between the exit of the debarking station and the entry of the chipping station, said rollers being driven to urge and guide the logs emerging from the debarking station toward the entry of the chipping station.

8. A mobile, combination log debarking and log chipping unit as defined in claim 7 wherein the lower rollers are a plurality of rollers spaced apart along said pathway and defining spaces through which bark falling from the logs is disposed.

9. A mobile, combination log debarking and log chipping unit as defined in claim 8 wherein the distance between the exit of the debarking station and the entry of the chipping station is in excess of six feet.

*10. A mobile, combination log debarking and log chipping unit for debarking and chipping multiple logs comprising;*

*a mobile chassis having opposed sides and ends that define a pathway of log processing directed from a receiving end to a discharging end of the chassis,*

*debarking flails mounted on the chassis in the pathway of undebarked logs directed along said pathway,*

*a chipping member mounted on the chassis in the pathway of the logs directed along said pathway, said debarking flails positioned for receiving and debarking logs and said chipping member positioned for chipping the logs after debarking,*

*conveyor means for conveying multiple logs along said pathway through the debarking flails and into the chipping member, and*

*said conveyor means, debarking flails, chipping member and chassis cooperatively organized and arranged to provide a spacing along the pathway between the end of the flails and the chipping member, and to provide a substantial discharge opening down through the defined pathway within said spacing whereby bark carried by logs from the debarking flails will be dropped from the logs through the defined pathway to thereby avoid conveyance of the bark by said conveyor means into the chipping member.*

*11. A combination unit as defined in claim 10 wherein the conveyor means discriminately conveys logs and not bark, said bark falling through the conveyor means.*

*12. A combination unit as defined in claim 11 wherein logs are conveyed across said spacing by spaced stationary rotating rollers to thereby provide the substantial discharge opening down through the defined pathway within said spacing.*

* * * * *